(12) United States Patent
Nowak et al.

(10) Patent No.: US 12,122,183 B2
(45) Date of Patent: Oct. 22, 2024

(54) METHOD FOR THE PRODUCTION OF A POLYVINYL CHLORIDE-FREE TOP LAYER, POLYVINYL CHLORIDE-FREE TOP LAYER AND DECKING ELEMENT

(71) Applicant: Parador GmbH, Coesfeld (DE)

(72) Inventors: Dirk Nowak, Nagold (DE); Christoph Wellekötter, Stadtlohn (DE); Frank Petersen, Coesfeld (DE)

(73) Assignee: Parador GmbH, Coesfeld (DE)

( * ) Notice: Subject to any disclaimer, the term of this patent is extended or adjusted under 35 U.S.C. 154(b) by 177 days.

(21) Appl. No.: 17/792,530

(22) PCT Filed: Aug. 24, 2021

(86) PCT No.: PCT/EP2021/073350
§ 371 (c)(1),
(2) Date: Jul. 13, 2022

(87) PCT Pub. No.: WO2022/078659
PCT Pub. Date: Apr. 21, 2022

(65) Prior Publication Data
US 2023/0068566 A1   Mar. 2, 2023

(30) Foreign Application Priority Data

Oct. 16, 2020 (DE) .................. 10 2020 006 377.2
Nov. 18, 2020 (DE) .................. 10 2020 007 039.6

(51) Int. Cl.
*E04B 2/00* (2006.01)
*B32B 3/06* (2006.01)
(Continued)

(52) U.S. Cl.
CPC ................ *B44C 5/04* (2013.01); *B32B 3/06* (2013.01); *B32B 5/18* (2013.01); *B32B 7/12* (2013.01);
(Continued)

(58) Field of Classification Search
CPC ........... B44C 5/04; B32B 9/045; B32B 21/02; B32B 21/08; B32B 21/14
See application file for complete search history.

(56) References Cited

U.S. PATENT DOCUMENTS

2010/0015452 A1* 1/2010 Helton .................... B32B 27/08
156/331.7
2010/0151239 A1* 6/2010 Hebert ...................... B32B 7/12
156/60

(Continued)

FOREIGN PATENT DOCUMENTS

EP   2883712 A1   6/2015

OTHER PUBLICATIONS

International Search Report for International Application No. PCT/EP2021/073350, mailed Dec. 7, 2021.

(Continued)

*Primary Examiner* — Basil S Katcheves
(74) *Attorney, Agent, or Firm* — Jason H. Vick; Womble Bond Dickinson (US) LLP

(57) ABSTRACT

The present invention relates to a method for producing a polyvinyl chloride-free top layer (1) for a decking element (3), the method comprising the method steps indicated below:
A) Providing a base layer (4) comprising and/or consisting of plastic;
B) Printing a décor (6) on a top (5) of the base layer (4) facing a usable side (7);
C) Bonding, preferably laminating, a, preferably transparent, wearing surface (8) to the printed base layer (4) to form a, preferably solid, layer composite (9);
D) Embossing the layer composite (9) at least in some areas, preferably over the entire surface, with a structure (10) at least substantially synchronous with the décor (6), the structure (10) being embossed in such a (Continued)

Figure 1:
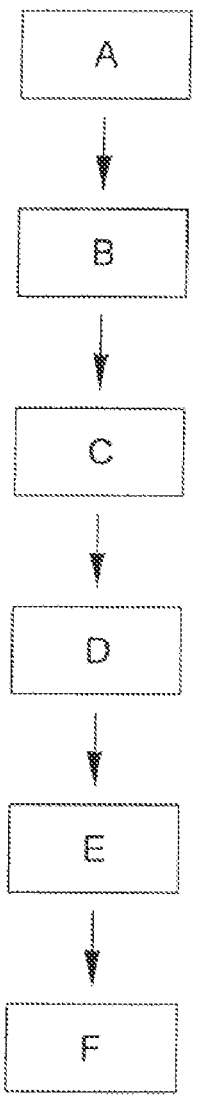

way that it is visible both on the top (11) facing the usable side (7) and at least in some areas on the bottom (12) of the layer composite (9) facing away from the usable side (7);

E) Application of a surface sealing layer (17), preferably a lacquer layer, to the top (11) of the layer composite (9) facing the usable side (7);

F) optionally: curing of the surface sealing layer (17), preferably the lacquer layer.

22 Claims, 8 Drawing Sheets

(51) Int. Cl.
| | |
|---|---|
| *B32B 5/18* | (2006.01) |
| *B32B 7/12* | (2006.01) |
| *B32B 9/02* | (2006.01) |
| *B32B 9/04* | (2006.01) |
| *B32B 21/02* | (2006.01) |
| *B32B 21/04* | (2006.01) |
| *B32B 21/06* | (2006.01) |
| *B32B 21/08* | (2006.01) |
| *B32B 21/14* | (2006.01) |
| *B32B 27/06* | (2006.01) |
| *B32B 27/08* | (2006.01) |
| *B32B 27/10* | (2006.01) |
| *B32B 27/32* | (2006.01) |
| *B32B 27/40* | (2006.01) |
| *B32B 38/00* | (2006.01) |
| *B32B 38/06* | (2006.01) |
| *B44C 1/24* | (2006.01) |
| *B44C 5/04* | (2006.01) |
| *E04F 13/08* | (2006.01) |
| *E04F 15/02* | (2006.01) |
| *E04F 15/10* | (2006.01) |

(52) U.S. Cl.
CPC ............... *B32B 9/02* (2013.01); *B32B 9/042* (2013.01); *B32B 9/045* (2013.01); *B32B 21/02* (2013.01); *B32B 21/047* (2013.01); *B32B 21/06* (2013.01); *B32B 21/08* (2013.01); *B32B 21/14* (2013.01); *B32B 27/065* (2013.01); *B32B 27/08* (2013.01); *B32B 27/10* (2013.01); *B32B 27/32* (2013.01); *B32B 27/40* (2013.01); *B32B 38/06* (2013.01); *B32B 38/145* (2013.01); *B44C 1/24* (2013.01); *E04F 13/0866* (2013.01); *E04F 13/0894* (2013.01); *E04F 15/02038* (2013.01); *E04F 15/107* (2013.01); *B32B 2255/10* (2013.01); *B32B 2255/26* (2013.01); *B32B 2255/28* (2013.01); *B32B 2266/025* (2013.01); *B32B 2307/412* (2013.01); *B32B 2307/732* (2013.01); *B32B 2317/02* (2013.01); *B32B 2317/122* (2013.01); *B32B 2317/16* (2013.01); *B32B 2323/04* (2013.01); *B32B 2323/10* (2013.01); *B32B 2375/00* (2013.01); *B32B 2419/04* (2013.01); *B32B 2607/02* (2013.01); *B44C 5/0461* (2013.01); *E04F 2201/0161* (2013.01); *E04F 2201/023* (2013.01); *E04F 2201/043* (2013.01)

(56) References Cited

U.S. PATENT DOCUMENTS

| | | | | |
|---|---|---|---|---|
| 2010/0297411 | A1* | 11/2010 | Tsai | B32B 9/02 428/213 |
| 2010/0300032 | A1* | 12/2010 | Kang | B32B 27/302 52/612 |
| 2011/0005159 | A1* | 1/2011 | Lee | B32B 21/08 428/319.7 |
| 2011/0070410 | A1* | 3/2011 | Huang | B32B 5/02 428/452 |
| 2011/0081514 | A1* | 4/2011 | Day | B32B 27/12 428/317.1 |
| 2011/0179734 | A1* | 7/2011 | Shaffer | B32B 27/10 52/309.1 |
| 2011/0183136 | A1* | 7/2011 | Gold | E04C 2/328 428/223 |
| 2011/0296780 | A1* | 12/2011 | Windmoller | B32B 27/304 156/182 |
| 2012/0042595 | A1* | 2/2012 | De Boe | E04F 15/02 52/582.2 |
| 2012/0213973 | A1* | 8/2012 | Clement | B44C 5/043 428/161 |
| 2013/0104478 | A1* | 5/2013 | Meersseman | E04C 2/20 52/309.1 |
| 2013/0104485 | A1* | 5/2013 | Meersseman | B27N 7/00 428/53 |
| 2013/0196119 | A1* | 8/2013 | Dobecz | B32B 37/003 156/87 |
| 2013/0278020 | A1* | 10/2013 | Preisler | B32B 15/20 296/193.07 |
| 2014/0109507 | A1* | 4/2014 | Dossche | B32B 5/18 428/455 |
| 2015/0030817 | A1* | 1/2015 | Wiegelmann | B44F 9/02 427/256 |
| 2015/0121793 | A1* | 5/2015 | Segaert | B32B 5/024 52/506.01 |
| 2017/0167145 | A1* | 6/2017 | Naeyaert | B32B 27/20 |
| 2017/0254095 | A1* | 9/2017 | Vandevoorde | E04F 15/06 |
| 2018/0202170 | A1 | 7/2018 | Duyck et al. | |
| 2018/0258652 | A1* | 9/2018 | Meersseman | E04F 15/02038 |
| 2019/0383030 | A1* | 12/2019 | Lombaert | B32B 27/32 |

OTHER PUBLICATIONS

Written Opinion for International Application No. PCT/EP2021/073350, mailed Dec. 7, 2021.

* cited by examiner

METHOD FOR THE PRODUCTION OF A POLYVINYL CHLORIDE-FREE TOP LAYER, POLYVINYL CHLORIDE-FREE TOP LAYER AND DECKING ELEMENT

CROSS REFERENCE TO RELATED APPLICATIONS

This application is a national stage application under 35 U.S.C. 371 of PCT Application No. PCT/EP2021/073350 having an international filing date of 24 Aug. 2021, which designated the United States, which PCT application claimed the benefit of German Application No. 10 2020 006 377.2, filed 16 Oct. 2020 and German Application No. 10 2020 007 039.6, filed 18 Nov. 2020, each of which are incorporated herein by reference in their entirety.

The invention relates to a method for producing a polyvinyl chloride-free top layer for a decking element, in particular a floor, wall or ceiling covering element. Preferably, the top layer is provided for bonding, preferably for lamination, to a carrier plate of the decking element.

Furthermore, the present invention relates to a polyvinyl chloride-free top layer, in particular provided for bonding, preferably for lamination, to a carrier plate of a decking element, as well as to a decking element having a top layer of the aforementioned type.

The use of plastic-containing surface layers for decking elements, in particular for vinyl coverings and/or laminate flooring, is preferred in practice due to low manufacturing costs. Plastic-containing top layers are particularly resistant to abrasion and cracking and/or exhibit high wear resistance. The top layers for the decking element provide the décor of the flooring and/or exhibit such a décor. The use of top layers containing plastics makes it possible to use different printable décors, thus allowing a high degree of flexibility in the design of the covering. In addition, a top layer containing plastic meets high requirements with regard to the hygiene of the covering. However, plastic-containing top layers of the type mentioned above usually feature the material polyvinyl chloride (PVC). If the material PVC is used, it is common practice to add plasticizers to the material that are hazardous to health.

Furthermore, it is known from practice to avoid the use of polyvinyl chloride (PVC) in the covering for health reasons. Thus, with a polyvinyl chloride-free top layer, the use of plasticizers or other harmful additives can be avoided. Plasticizers for polyvinyl chloride in particular are hazardous to health and should therefore be avoided. Therefore, in the prior art, plastics that are free of polyvinyl chloride and thus do not require plasticizers for the polyvinyl chloride are used for the plasticized top layer.

In order to improve the haptics and the overall appearance of the decking element, it is known in the prior art that the PVC-free top layer has a surface structuring, which can be introduced, for example, in the course of pressing the top layer. However, due to restrictions in the manufacturing process, this surface structuring does not meet high requirements in terms of haptics, especially since structuring is only possible in the uppermost layer of the top layer. Thus, only comparatively shallow depths of structuring can be produced, which are hardly perceived by the user. Ultimately, no "realistic" embossing of the structuring is possible with surface layers that are free of polyvinyl chloride.

Accordingly, although a polyvinyl chloride-free top layer has the advantage of avoiding health hazards, there are disadvantages with regard to the overall appearance and, in particular, with regard to the feel of the top layer.

It is now the object of the present invention to avoid or at least substantially reduce the aforementioned disadvantages of the prior art.

According to the invention, the above-mentioned object is at least substantially solved in a method for producing a polyvinyl chloride-free top layer for a decking element in that the method comprises the method steps indicated below, preferably in the order indicated:
  A) Providing a base layer comprising and/or consisting of plastic;
  B) Printing of a décor on a top of the base layer facing a usable side;
  C) Bonding, preferably lamination, of a, preferably transparent, wearing surface with the printed base layer to form a, preferably solid, layer composite;
  D) Embossing the layer composite at least in some areas, preferably over the entire surface, with a structure at least substantially synchronous with the décor, the structure being embossed in such a way that it is visible both on the top facing the usable side and at least in some areas on the bottom of the layer composite facing away from the usable side;
  E) Application of a surface sealing layer, preferably a lacquer layer, to the top of the layer composite facing the usable side;
  F) optional: hardening of the surface sealing layer, preferably the lacquer layer.

Among other things, the sequence of the method steps is discussed below. It is understood in this context that the designation "before" refers to previous and not to the exact previous method step. If, for example, method step Y is carried out before method step Z, this is to be interpreted as meaning that method steps X and/or P can also be carried out after step Y has been carried out and before step Z has been carried out.

The same applies to the designation "after". If, for example, method step Y is carried out after method step Z, this is to be interpreted in such a way that method steps X and/or P can also be carried out after step Z has been carried out and before step Y has been carried out.

In the context of the present invention, a top layer is also understood to mean, in particular, a multilayer composite with at least two layers and/or, which may be composed of individual sheets that are preferably—in the final state—firmly bonded to one another.

According to the invention, it is understood that the method steps A) to F) can also be carried out in a different sequence. Preferably, method steps A), B) and C) are first carried out in succession. Subsequently, in further embodiments, the method steps D) to F) can also be carried out in a different sequence.

It is also understood that method step F) can be carried out optionally. According to the invention, "curing" also means self-curing and/or self-drying of the surface sealing layer.

The surface sealing layer can be formed as a surface coating and/or as a lacquer layer. The material of the surface sealing layer may in particular comprise and/or consist of at least one polymer compound. Preferably, the material of the surface sealing layer has been chemically produced.

In particular, coatings can be used for surface sealing. A lacquer is understood to mean, in particular, a liquid and/or powder coating material that can be applied to a surface. By means of various chemical and/or physical processes, which may also include self-drying and/or self-curing, the coating can be formed into a, preferably continuous and/or solid, film.

Preferably, the lacquer layer may comprise resins, dispersions and/or solvents as materials.

In addition, the surface sealing layer may have "natural" substances, such as waxes, in addition to chemical compounds to seal the surface.

For the purposes of the present invention, a décor-synchronous embossing means an embossing in which the embossed structure is oriented to the décor—i.e., the décor printed on the base layer. In particular, the décor-synchronous embossing is formed at least substantially synchronously with the décor or with a plurality of elements, such as cracks, knots or the like.

According to the invention, it can also be provided that the décor-synchronous embossing is carried out only in certain areas, with the base layer also comprising further areas or the décor comprising further elements which have décor-synchronous embossing or no embossing or structuring.

Ultimately, a décor-synchronous embossing or a so-called "synchronous pore" is understood to mean that, for example, recesses shown in the printed décor are also actual recesses in the layer composite or in the top layer. However, this can only be provided for certain recesses or only in certain areas. The recesses are not formed as a breakthrough, but in the area of the structure in particular the layer composite is constricted and/or impressed, in particular pressed in.

The recesses of the structure can run in longitudinal, transverse and intermediate directions of the decking element or the top layer. At the same time, however, the recesses can also have different shapes, for example curved, in particular according to the specification of the printed décor.

In addition, the recesses can run selectively in one area and, in particular, elongated in another area. This depends in particular on the selected décor that has been printed onto the base layer.

Further, the recesses of the structure may also extend over multiple structural layers or have multiple structural layers.

In practice, common décors are wood motifs and/or stone motifs, wherein the "synchronous pore" or the embossed structure is based on the selected décor. Ultimately, however, any décor can also be provided with a décor-synchronous structure. In particular, as explained above, only individual elements or individual areas of a décor, such as prominent cracks, knots, flowers or the like, can be embossed synchronously.

In addition, a décor-synchronous embossing is understood to be an embossing with tolerances of no more than 3 mm in height and/or width in the synchronicity of structure and décor.

Compared to the state of the art, the main advantage is that the overall appearance of the top layer and/or of the decking element provided with the top layer can be improved, since instead of a décor-asynchronous surface structure, an at least essentially décor-synchronous surface structure can be provided.

Furthermore, according to the invention, it is possible to structure not only the uppermost layer of the top layer, but also other layers, for example the base layer. According to the invention, this makes it possible in particular to increase the maximum depth of the surface structuring and/or structure achieved.

In particular, the embossed structure can show through and/or stand out over the entire thickness of the top layer, which ultimately helps to improve the feel. It is understood that the surface structuring on the top may differ from the surface structuring on the bottom of the top layer. For example, the maximum depth of the surface structuring on the top side may exceed the maximum height of the surface structuring on the bottom side.

For the purposes of the present invention, the usable side is understood to be the side that is exposed to stresses in the installed state and, in particular, serves as the running surface or outer surface. If, for example, a floor covering element is formed as the decking element, the usable side is the outer side of the decking element facing the room.

It is particularly preferred that the embossed structure of the layer composite is only so strongly visible on the bottom of the layer composite that it can be easily bonded, in particular laminated, to a further carrier layer and/or carrier plate or carrier film in a further manufacturing process. Sufficient adhesion of the top layer can thus be ensured for use as a floor covering.

The top layer can ultimately be used as a half part for the production of decking elements. In particular, the surface layer can also be temporarily stored as a half part before being connected to the carrier plate and/or the decking element. In this way, different decking elements can be achieved by connecting different top layers, in particular wherein the further structure of the decking element can be at least substantially the same or structurally identical.

By laminating the top layer, it is possible in particular to achieve an individually predeterminable appearance of the decking element. The embossed décor-synchronous structure can also improve the overall appearance and feel, particularly at low manufacturing costs.

The separation of the production processes of manufacturing the top layer and bonding the top layer to a carrier plate of the decking element according to the invention preferably makes it possible to simplify the manufacture of the entire decking element and to reduce the manufacturing costs due to inline production for bonding the top layer that is not required.

Furthermore, according to the invention, a top layer comprising and/or consisting of plastic, which does not contain polyvinyl chloride, can be provided with the synchronous structure, wherein the expansion behavior of the layer composite can be better taken into account by separating the embossing of the structure from the lamination onto the decking element.

In addition, cost savings result from the reduction of scrap due to successive implementation of lamination or bonding and structuring.

In a particularly preferred embodiment, the application of the surface sealing layer, preferably the lacquer layer (cf. method step E), is carried out before or after the embossing of the layer composite. Thus, method step E) can be carried out before or after method step D). The advantage of applying the surface sealing layer (method step E) after embossing (method step D) is that the surface sealing layer, in particular the coating, can adapt to the embossed structure and in particular is not damaged by embossing.

However, depending on different method designs, it may also be useful to apply the surface sealing layer prior to embossing, in particular to protect underlying layers during the embossing process.

Hardening of the surface sealing layer (method step F) is carried out after application of the surface sealing layer (method step E). However, hardening can also be carried out before or after embossing (method step D). The sequence may depend on whether the surface sealing layer has been applied to the layer composite before or after embossing of the layer composite. Accordingly, in a further embodiment, it can be provided that the surface sealing layer is applied to the layer composite and the layer composite is subsequently embossed, with the curing being carried out after embossing. In principle, however, it can also be provided that the surface sealing layer is applied before embossing and subsequently cured—also before embossing. Method steps E) and F) can thus be carried out before method step D).

Preferably, the hardening of the surface sealing layer, preferably the lacquer layer, is carried out by means of electron beam hardening. Electron beam curing has the advantage that the surface sealing layer and/or the lacquer is arranged on the embossed structures and continues to be arranged on and/or "stick" to the embossed structures after electron beam curing. Furthermore, electron beam curing can avoid heating and/or heating the entire layer structure of the surface sealing layer, which would otherwise have an influence on the material properties of the further layers. Furthermore, curing of the surface sealing layer and/or the lacquer layer with low-energy accelerated electrons is a method that is not only modern in practice but also extremely fast-acting (i.e., fast) and can also be carried out in a resource-conserving and energy-saving manner. Electron beam curing ultimately leads in particular to molecules in reactive lacquer systems being able to crosslink with one another in a normal pressure atmosphere. Gentle processing by electron beam curing also allows temperature-sensitive additional layers or a temperature-sensitive layer composite to be used.

The cured surface sealing layer exhibits high abrasion resistance with simultaneous temperature resistance. In addition, there is very good adhesion between the top of the wearing surface facing the surface sealing layer and the surface sealing layer. In addition, a high UV resistance of the entire layer composite and/or the entire top layer can be made possible by the electron beam-cured surface sealing layer.

In a further preferred embodiment of the invention, it is provided that a first adhesion promoter layer is applied to the bottom of the base layer prior to lamination or bonding with the wearing surface. The first adhesion promoter layer may also be referred to as a primer layer and may be provided, in particular, for subsequent bonding of the top layer to the carrier plate of the decking element. Indeed, the bottom of the base layer may in particular form the outer side (bottom) of the top layer. Ultimately, the "adhesive function" of the top layer can be provided by the first adhesion promoter layer, so that a simplified connection or lamination with the carrier plate of the decking element can be ensured.

Alternatively, or additionally, it is preferably provided that a further adhesion promoter layer is applied at least in some areas after formation of the layer composite (cf. method step C) and before application of the surface sealing layer (cf. method step E) to the top side of the wearing surface facing away from the base layer. At the time of application of the further adhesion promoter layer, which can also be referred to as a further primer layer, the top side of the wearing surface in particular is the top-side outer surface of the layer composite.

The surface sealing layer, preferably the lacquer layer, can in particular be applied to the further adhesion promoter layer. The further adhesion promoter layer can thus improve the bond between the wearing surface and the surface sealing layer and preferably ensure a durable bond between the wearing surface and the surface sealing layer.

In this context, it is understood that the further adhesion promoter layer can also be provided independently of the first adhesion promoter layer. The naming "further" adhesion promoter layer ultimately makes it possible to distinguish it from the first adhesion promoter layer.

Preferably, both the first and/or the further adhesion promoter layer has an adhesive as material, in particular wherein the adhesive has a resin base, in particular a synthetic resin base.

Also, the further adhesion promoter layer can be applied after the structure is embossed, so that the further adhesion promoter layer can align with the embossed structure.

Preferably, a lamination method is carried out in method step C to bond the wearing surface to the printed base layer. During lamination, preferably thermal lamination, the wearing surface is bonded in particular to the base layer by pressure and/or heat.

In addition, a laminating agent, in particular an adhesive, can be used during lamination to bond the wearing surface to the base layer. Thus, after lamination, at least one laminating agent layer can be arranged between the top side of the base layer facing the wearing surface and the bottom side of the wearing surface facing the base layer. Ultimately, the laminating agent layer is an adhesive layer that can be arranged in areas, preferably over the entire surface, between the wearing surface and the base layer. In particular, the laminating agent may be a urethane adhesive, varnish, glue and/or resin. The laminating agent is also preferably used in a thermal laminating process. Furthermore, the laminating agent can be applied to the side of the wearing surface facing away from the usable side and/or to the top side of the base layer, at least in certain areas, prior to lamination. After application of the laminating agent layer, lamination can be carried out, preferably by means of pressure and/or heat, to firmly bond the wearing surface and the base layer.

Alternatively, or additionally, the wearing surface is joined to the base layer to form the layer composite (cf. method step C) by means of lamination. A lamination method is to be understood in particular as a materially bonded, thermal joining method without the use of auxiliary materials. Thus, in particular, the application of a laminating agent can be dispensed with during lamination. Preferably, hot lamination is carried out as the joining process, in which in particular the adhesive properties of the wearing surface and/or the base layer can be used to firmly join the layer composite.

In a further preferred embodiment, the layer composite is embossed (cf. method step D) by means of a structural cylinder. In particular, the laminate is embossed and/or pressed and/or heated for embossing, preferably by means of pressure and/or heat. The structure cylinder assumes in particular a repeating sequence of the décor or a décor pattern repeating in successive sections, in particular wherein the length of a section depends on the surface area or circumference of the cylinder or vice versa.

Alternatively or additionally, a structure paper can be used. In the case of structure papers, the length of a "structure section" in particular is not dependent on the circumference of the structure cylinder. Accordingly, shorter or longer structure sections can be realized.

Preferably, a printing cylinder is used to apply the décor layer. In particular, expansion can also occur during printing, for example due to the pressure of the impression cylinder and/or due to contact with ink and/or water, especially when printing on paper. This expansion is preferably to be taken into account during the creation of the printing cylinder. In particular, impression cylinders and/or structure cylinders must be matched to each other for a "synchronous pore" so that the décor produced by the impression cylinder can be embossed synchronously with the décor in the following step by a corresponding structure cylinder.

When using a structural cylinder and/or impression cylinder, calibration of the printing and/or embossing method is particularly advantageous. Thus, in a calibration process, which in particular is upstream of the manufacturing process, the coefficient of expansion of the layer composite (in the case of the structural cylinder) and/or of the top layer can be determined in a first method step, in particular with the information determined in this respect being used in the manufacture of the corresponding structural cylinder and/or impression cylinder—in particular as a function of the décor to be printed.

In the printing method with a printing cylinder, the expansion refers in particular to the base layer and not to the entire top layer, especially since the printing takes place before the layer composite is created.

It can be provided that the structure cylinder has so-called alignment marks, also referred to as register marks, at certain marking points. Corresponding register marks and/or alignment marks can be provided on the printed top layer and/or on the impression cylinder. Alignment, in particular by optical systems such as cameras, enables adjustment and, in particular, preferably décor-synchronous embossing.

Alternatively or additionally, the register marks can also be used to check the synchronicity of décor and structure afterwards or after production of the top layer. In this way, iterative adjustment of the structure cylinder and the printed pattern can be achieved, so that embossing of the décor that is as precisely synchronous as possible is possible.

Ultimately, there is a mismatch between the structure on the structure cylinder and the dried embossed structure, preferably the top layer, due to the expansion behavior of the heated material.

In a further preferred embodiment, the décor can be printed onto the base layer by means of different printing processes, such as offset printing, flexographic printing, digital printing and/or gravure printing. Particularly preferably, the décor is applied to the base layer by means of a rotogravure printing process. The printing method can be selected depending on the base layer to be printed and/or depending on the desired printed image or décor to be produced.

Preferably, the printing of the décor is made up of several individual image layers, in particular with the printing being carried out by a rotogravure printing process. A rotogravure printing method enables in particular a high printing speed and thus preferably low manufacturing costs.

Furthermore, the present invention relates to a polyvinyl chloride-free top layer, preferably a top layer comprising plastic and/or consisting thereof, which is provided for bonding, preferably for lamination, to a carrier plate of a decking element. In particular, the top layer has been produced by a method according to one of the aforementioned embodiments. The top layer according to the invention has a base layer printed with a décor and a wearing surface. The base layer and the wearing surface are firmly bonded to one another to form a layer composite.

It is understood that the layer composite may also comprise further layers. The layer composite is embossed with a structure which is provided at least in regions and is at least substantially synchronous with the décor. The embossed structure is distinguishable both on the top and at least in regions on the bottom of the layer composite. Likewise, the top layer has a cured surface sealing layer, preferably a lacquer layer, which is provided on the top of the layer composite.

To avoid unnecessary explanations and/or repetitions, reference may be made to the preceding explanations, which can also apply in the same way to the polyvinyl chloride-free top layer according to the invention. In particular, reference may be made to the above explanations with regard to the advantages of the polyvinyl chloride-free top layer.

Preferably, the top layer can be applied to the carrier layer, in particular by lamination with a laminating agent, without significantly reducing the structure depth. The laminating agent can compensate for and/or fill different protrusions and/or recesses and/or unevenness on the bottom of the top layer. The depth of the structure of the top layer according to the invention is preferably consequently not unintentionally smoothed during the bonding of the top layer and the carrier plate and/or carrier layer—for example by pressing, by high pressure and/or by heat.

The structure emerging on the top of the top layer, which ultimately faces the usable side, may differ from the structure emerging on the bottom. For example, the top side may be provided with the at least substantially décor-synchronous structure over at least its entire surface, whereas the structure on the bottom may only be apparent in areas. For example, only the particularly deep recesses of the top-side structure may be apparent on the bottom.

Preferably, the structure has a maximum depth, preferably on the top of the layer composite and/or the top layer, of up to 1 mm, preferably up to 0.5 mm, more preferably between 0.05 mm to 0.2 mm. In particular, the maximum depth on the top of the layer composite of the embossed structure is 0.16 mm+/−0.05 mm. The maximum depth can thus be significantly increased compared to the prior art, preferably by at least 75%.

Alternatively, or additionally, it may be provided that the structure on the bottom/underside of the layer composite and/or on the bottom of the top layer has a maximum height of at most 100 μm, preferably at most 90 μm, more preferably between 30 μm to 90 μm. The aforementioned size specifications make it clear, in particular, that the maximum depth of the structure on the top and differs from the maximum height of the bottom. In this context, it is understood that the maximum depth on the top corresponds to a, in particular maximum, height of the protrusion on the bottom corresponding to the recesses on the top. The maximum height on the bottom is to be understood in such a way that it indicates the distance between the base surface and/or normal plane and the protrusion.

The top layer preferably has a thickness between 0.1 mm, preferably between 0.1 mm and 0.4 mm, more preferably between 0.2 mm to 0.3 mm.

Preferably, the base layer and/or the wearing surface has a thermoplastic material as the polyvinyl chloride-free material and/or consists thereof. In particular, polypropylene, polyethylene and/or polyurethane are provided as the thermoplastic. The aforementioned plastics enable, in particular, an ecological and non-health-damaging decking element and/or a corresponding top layer.

In another preferred embodiment, the base layer is formed as a base film and/or a base foil.

Furthermore, the present invention relates to a decking element, provided for use as a floor, wall and/or ceiling covering element for a floor, wall and/or ceiling covering. The decking element according to the invention comprises at least one carrier plate and at least one top layer according to at least one of the preceding embodiments. The bottom of the top layer facing away from the usable side is preferably firmly connected to the top of the carrier plate facing the usable side.

In particular, at least one further layer can be arranged between the top layer and the carrier plate, preferably an elasticity layer, a sound and/or impact absorption layer and/or an electrical functional layer.

In connection with the decking element according to the invention, it is understood that the aforementioned explanations concerning the method according to the invention as well as concerning the top layer according to the invention also apply in the same way to the decking element according to the invention, without this requiring explicit mention. In particular, in connection with preferred embodiments and/or advantages of the decking element according to the invention, reference may be made to the above explanations concerning the method according to the invention and/or concerning the top layer according to the invention.

In a particularly preferred embodiment, corresponding tongue-and-groove connecting geometries are provided on opposite sides of the carrier plate. Connection geometries serve in particular to form a click connection. Furthermore, the connecting geometries have a groove side having a groove and a tongue side opposite the groove side and having a tongue. In this context, it is understood that both the longitudinal sides and/or the transverse sides can have the corresponding connecting geometries, so that the carrier plate has, in particular, connecting geometries running around the edges. Thus, the longitudinal sides can form mutually corresponding tongue-and-groove connecting geometries, while the transverse sides of the carrier plate can also form mutually corresponding tongue-and-groove connecting geometries.

Alternatively or additionally, corresponding pushbutton and/or bayonet connection geometries can be provided on opposite sides of the carrier plate. Ultimately, the aforementioned connection geometries serve in particular for simple click connection of the decking elements. This enables simple and fast installation, which in particular does not have to be carried out by skilled personnel.

Preferably, a countermove is arranged on the bottom of the carrier plate. The countermove can ultimately face the bottom of the carrier plate. Preferably, a kraft paper and/or a cork layer and/or a layer of expanded polyolefin (XPO) can be provided as a countermove. The countermove serves in particular to prevent the decking element from deforming.

In a further preferred embodiment, a HDF board (high-density fiberboard), a real wood layer and/or a MDF board (medium-density fiberboard) can be provided as the carrier plate. Alternatively, or additionally, it can also be provided that the carrier plate has a plastic as material and/or consists thereof. Polypropylene and/or polyethylene is preferably provided as the plastic. Furthermore, it is particularly preferred that the carrier plate is designed to be polyvinyl chloride-free, so that a polyvinyl chloride-free decking element can preferably be provided.

In addition, the carrier plate can also have a low swelling value and, in particular, be designed to be at least substantially waterproof and/or water-resistant, preferably by integrating additives into the carrier plate, in particular glues and/or resins.

In addition, the carrier plate may also have mineral constituents. Calcium carbonate and/or talc may be provided as mineral components. In particular, the carrier plate may also comprise plastics and/or minerals.

In addition, the carrier plate may have a layer thickness of at least 2 mm, preferably between 3 mm to 10 mm, more preferably between 4 mm to 7 mm.

Further features, advantages and possible applications of the present invention will be apparent from the following description of examples of embodiments based on the drawing and the drawing itself. In this context, all the features described and/or illustrated constitute the subject-matter of the present invention, either individually or in any combination, irrespective of their summary in the claims or their relation back.

Figure 2:
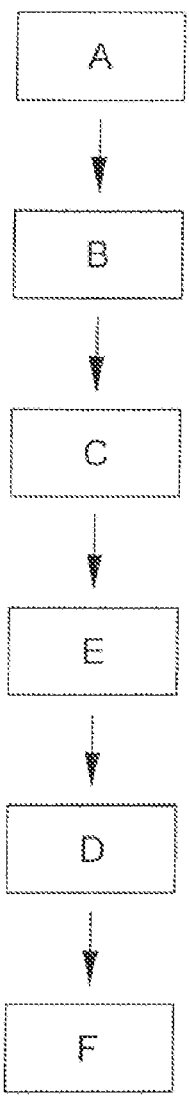
Figure 3:
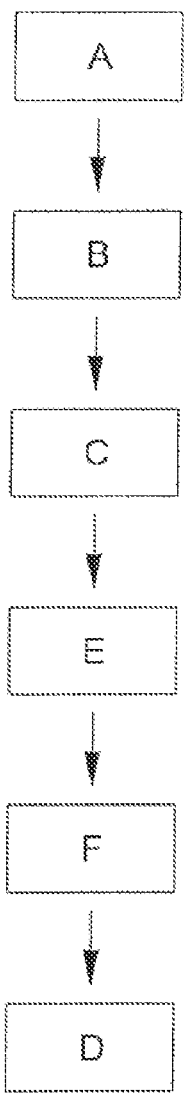
Figure 4:
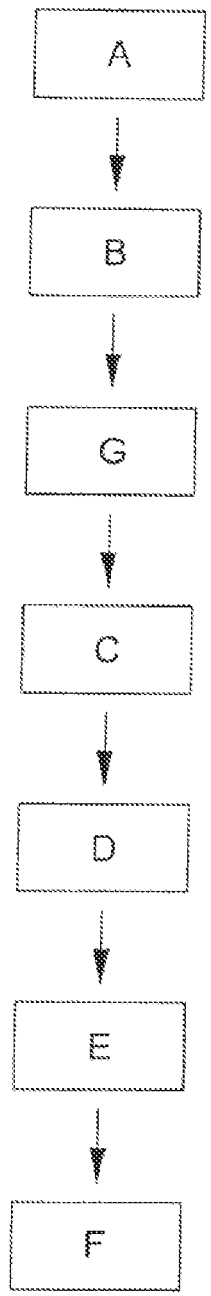
Figure 5:
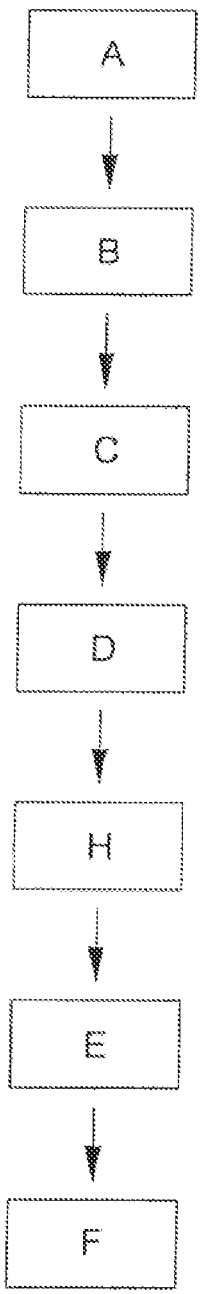
Figure 6:
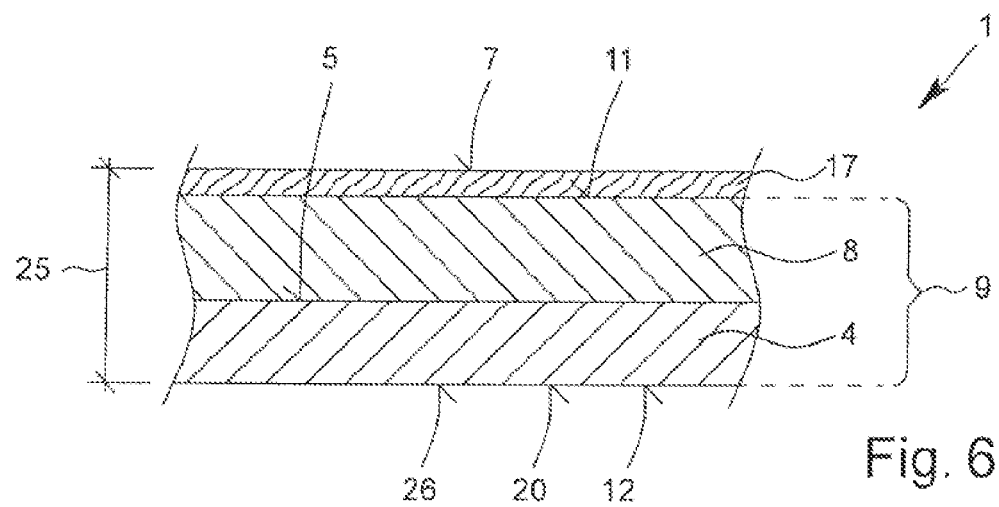
Figure 7:
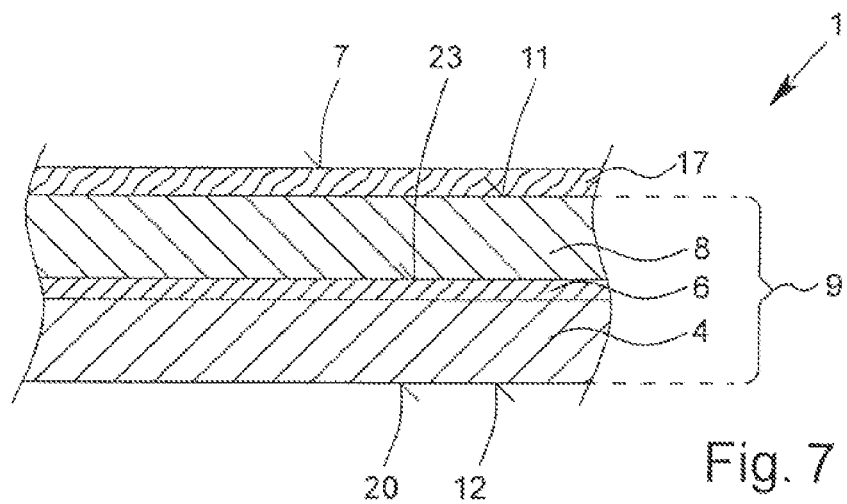
Figure 8:
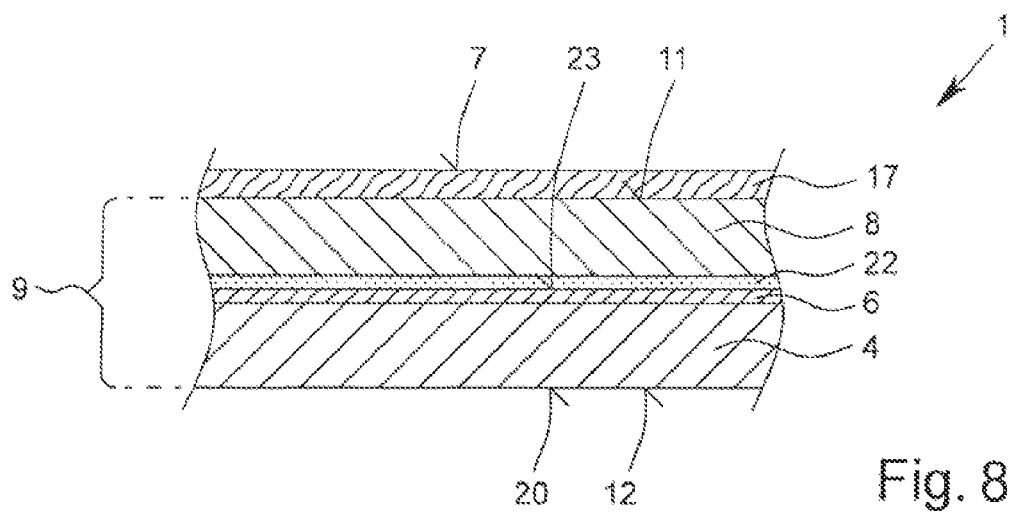
Figure 9:
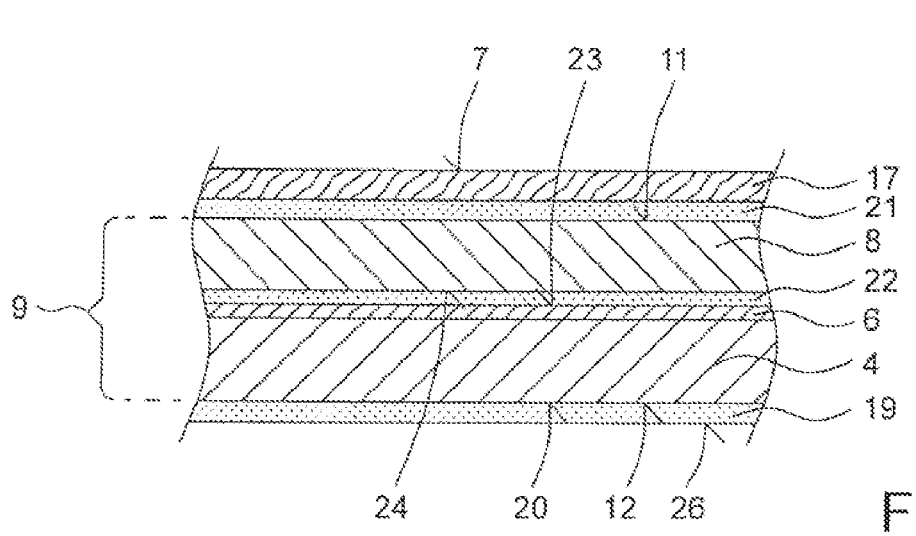
Figure 10:
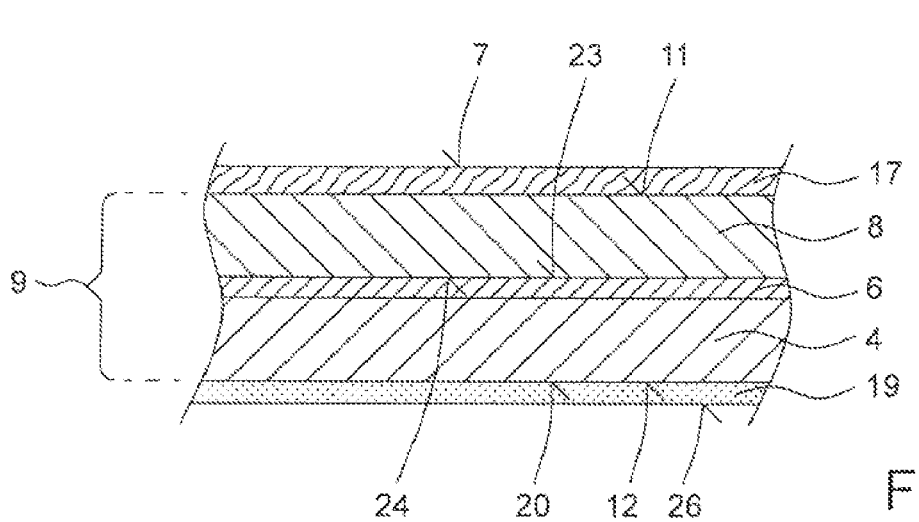
Figure 11:
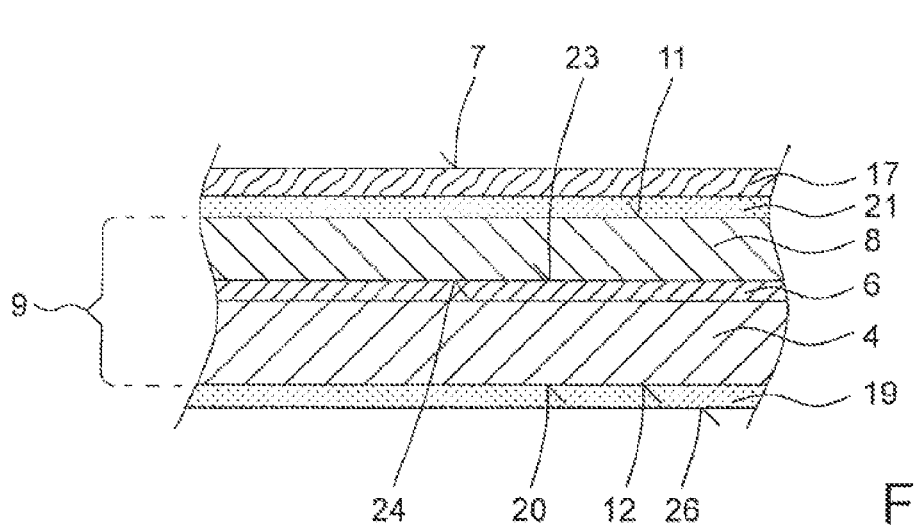
Figure 12:
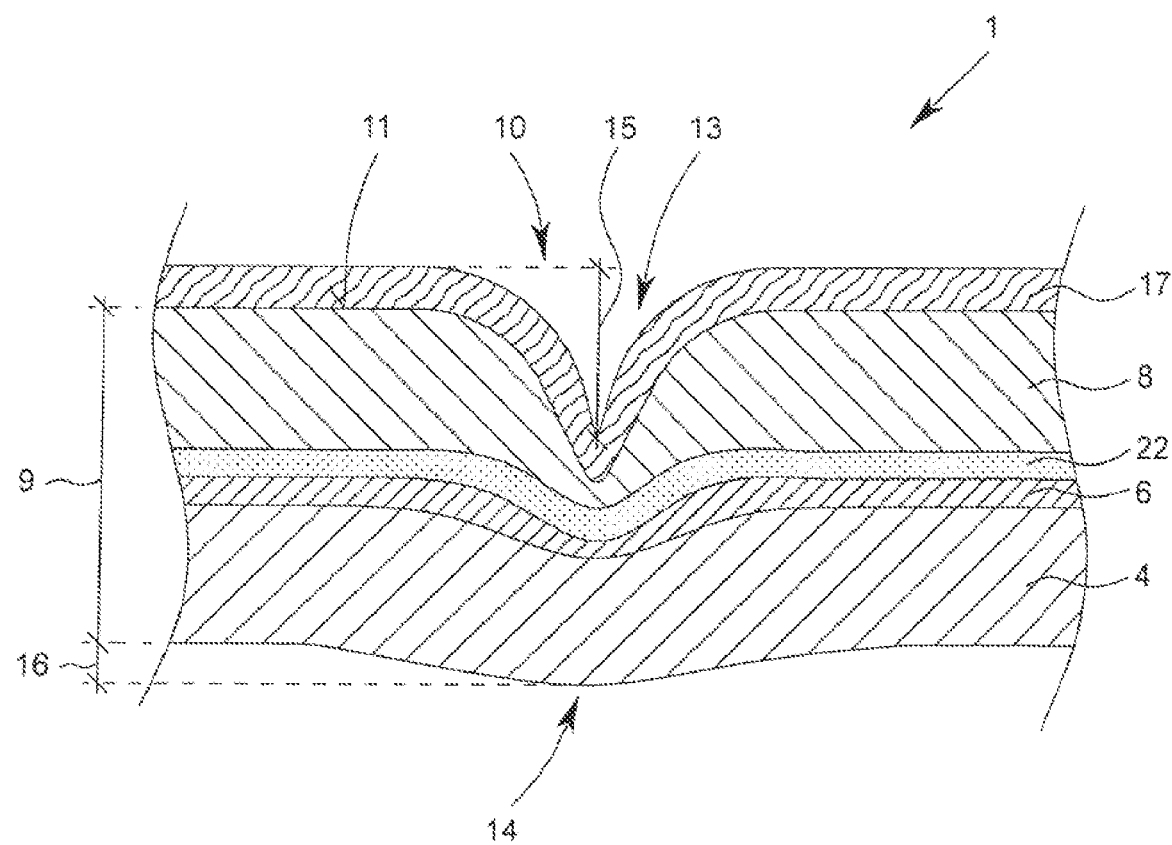
Figure 13:
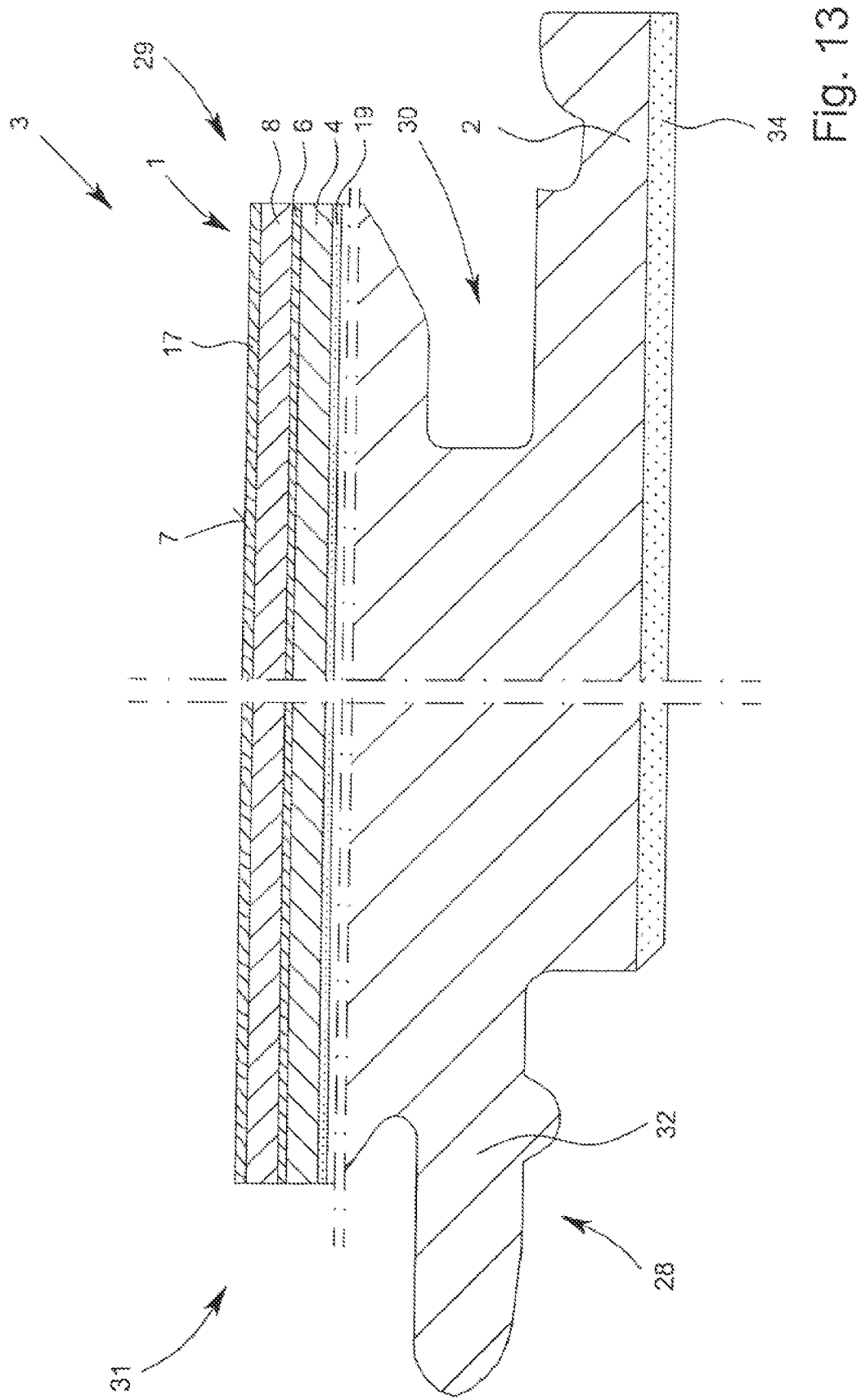
Figure 14:
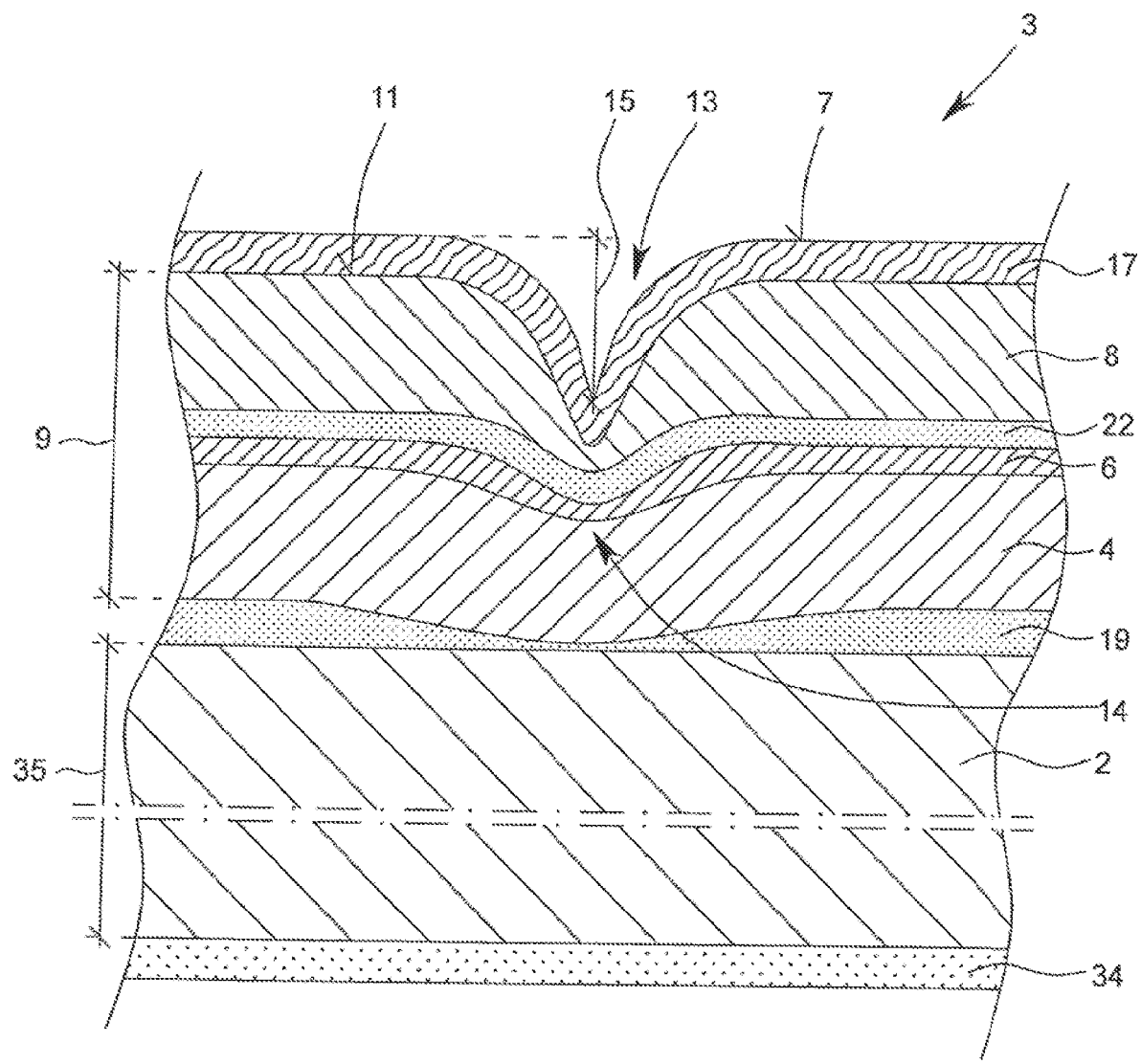
Figure 15:
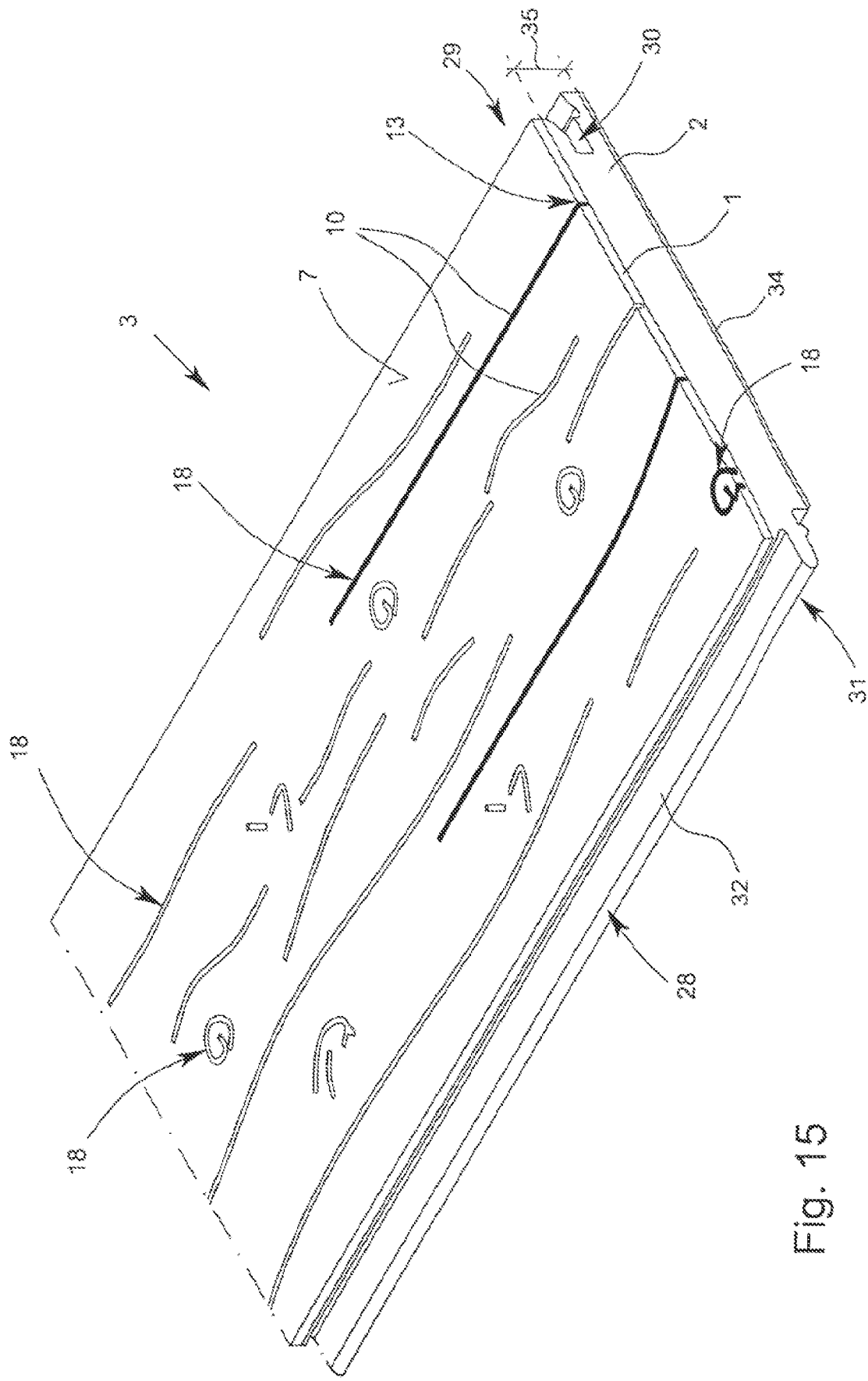

It shows:

FIG. 1 a schematic representation of a method sequence according to the invention for the production of a polyvinyl chloride-free top layer according to a first embodiment, FIG. 2 a schematic representation of a method sequence according to the invention for the production of a polyvinyl chloride-free top layer according to a second embodiment, FIG. 3 a schematic representation of a method sequence according to the invention for the production of a polyvinyl chloride-free top layer according to a third embodiment, FIG. 4 a schematic representation of a method sequence according to the invention for the production of a polyvinyl chloride-free top layer according to a fourth embodiment, FIG. 5 a schematic representation of a method sequence according to the invention for the production of a polyvinyl chloride-free top layer according to a fifth embodiment, FIG. 6 a schematic cross-sectional view of a top layer according to the invention, FIG. 7 a schematic cross-sectional view of a further embodiment of a top layer according to the invention, FIG. 8 a schematic cross-sectional view of a further embodiment of a top layer according to the invention, FIG. 9 a schematic cross-sectional view of a further embodiment of a top layer according to the invention, FIG. 10 a schematic cross-sectional view of a further embodiment of a top layer according to the invention, FIG. 11 a schematic cross-sectional view of a further embodiment of a top layer according to the invention, FIG. 12 a schematic cross-sectional view of a further embodiment of a top layer according to the invention, FIG. 13 a schematic cross-sectional view of a decking element according to the invention, FIG. 14 a schematic cross-sectional view of a decking element according to the invention in accordance with a further embodiment, and FIG. 15 a schematic perspective view of a decking element according to the invention in accordance with a further embodiment.

FIG. 1 shows a flow chart of a method for producing a polyvinyl chloride-free top layer 1. The top layer 1 can have a multilayer structure, as shown schematically in FIG. 6. The top layer 1 can be provided for lamination or for bonding to a carrier plate 2 of a decking element 3.

In FIG. 1, the individual method steps have been identified by letters. In this context, each letter refers to an individual method step, as will be explained below.

The method step denoted by A in FIG. 1 involves the provision of a base layer 4 comprising and/or consisting of plastic. A base layer 4 is shown schematically in FIG. 6, for example.

Following method step A, step B provides for the top 5 of the base layer 4 to be printed with a décor 6. By printing with the décor 6, a décor 6 can ultimately be provided. The top 5 of the base layer 4 faces a usable side 7. The usable side 7 ultimately represents the side of use in the installed state of the decking element 3—for example, the running surface when the decking element 3 is used as a floor covering element.

In FIG. 1, following method step B, method step C provides for the base layer 4 to be bonded to a wearing surface 8. The wearing surface 8 is in particular transparent or at least substantially transparent. Preferably, in method step B, a laminating method is provided for joining the base layer 4 and the wearing surface 8. After bonding the layers 4, 8, a layer composite 9 is obtained, which may have layers 4, 8 firmly bonded to one another. In addition to the wearing surface 8 and/or the base layer 4, the layer composite 9 may also comprise further layers.

It should be noted at this point that further method steps can also be provided between the individual method steps shown. Finally, the schematic sequence of the individual method steps shown is visualized in the flow charts shown in FIGS. 1 to 5.

Furthermore, the successive method steps can be carried out at least substantially immediately one after the other or with a time delay.

For example, a further method step, such as intermediate storage of the base layer, can be provided between method step A and step B. The time intervals between the individual method steps following one another also can also differ.

FIG. 1 further shows that subsequently to method step C in method step D it is provided that the layer composite 9 is embossed at least in some areas, preferably over the entire surface, with a structure 10 that is at least substantially synchronous with the décor 6. The structure 10 is embossed in such a way that it is visible both on the top 11 of the layer composite 9 facing the usable side 7 and on at least some areas of the bottom 12 of the layer composite 9 facing the usable side 7. The structure 10 can be formed on the top 11 by recesses 13. Protrusions 14 on the bottom 12 of the layer composite 9 may correspond to the recesses 13 on the top 11. In this context, the depth 15 of a first recess 13 can differ from the height 16 of the first protrusion 14 corresponding to the first recess 13, so that the height 16 can be formed smaller than the depth 15, as this is shown schematically in FIG. 12, for example.

After method step D, in method step E, as can be seen schematically from FIG. 1, a surface sealing layer 17, preferably a lacquer layer, can be applied to the top 11 of the layer composite 9 facing the usable side 7.

Following method step E, method step F provides for the surface sealing layer 17, preferably the lacquer layer, to be cured.

FIG. 15 shows schematically that embossing of the structure 10 synchronously with the décor means that the embossed structure 10 is ultimately oriented at least substantially to the décor 6 and, in particular, is formed at least substantially synchronously with the décor 6—i.e., for example, that at least some elements 18 of the décor 6 correspond to the structure 10 in such a way that a recess shown as element 18 corresponds at least substantially to an actual recess 13 on the top 11 of the layer composite 9. Minor deviations due to the manufacturing method may occur and amount to a maximum of 2 mm+/−1 mm, for example.

In particular, shown cracks, knots or the like of the décor 6 can correspond to corresponding recesses 13. In this context, it is understood that further elements 18 of the dé-cor 6 may also be present which do not correspond to the structure 10. Ultimately, a dé-cor-synchronous embossing is to be understood as meaning that several elements 18 of the décor 6 or also individual partial areas are formed synchronously with the structure 10—even if further elements 18 or further partial areas of the décor 6 have an asynchronous structure 10.

The protrusion 14 on the bottom 12 is designed in such a way that good adhesion or adhesiveness can still be ensured during subsequent application and/or subsequent bonding, in particular lamination, of the top layer 1 to the carrier plate 2. Thus, the structure 10 can thus become visible on the bottom 12, but the adhesion of the entire top layer 1 continues to be ensured.

FIG. 2 shows that the application of the surface sealing layer 17 in method step E can also take place before the embossing step D. The curing in method step F of the surface sealing layer 17 can thereby take place before or after the embossing in step D. FIG. 2 shows that curing F takes place after embossing D. method steps A to C are preferably still carried out in succession, as the comparison of FIG. 1 with FIG. 2 makes clear.

FIG. 3 shows that the surface sealing layer 17 in method step F is applied before the embossing in method step D. Thus, the hardening in method step F can take place after the application of the surface sealing layer 17 in method step E—but before or after the embossing in method step D.

FIG. 4 shows that a further method step and/or method step G is provided, which in the embodiment shown is carried out before method step C (namely the bonding of the wearing surface 8 and the base layer 4 to form a layer composite 9). In method step G, a first adhesion promoter layer 19 is applied to the bottom of the base layer 4—that is, to the bottom 20 of the base layer 4. The first adhesion promoter layer 19 is shown schematically in FIG. 9. The method step G can also take place and/or be carried out after the method steps C, D, E and/or F, in particular after the method step F has been carried out.

In principle, it can also be envisaged that method step G can be carried out at least substantially simultaneously with method step B.

FIG. 5 shows the integration of method step H into the schematic method sequence. method step H can be carried out in addition to or as an alternative to method step G. In method step H, it is provided that another adhesion promoter layer 21, as shown schematically in FIG. 9, is applied at least in certain areas after formation of the layer composite 9 (cf. method step C) and before application of the surface sealing layer 17 (cf. method step E) on the top 11 of the wearing surface 8 facing away from the base layer 4. Accordingly, the other adhesion promoter layer 21 can be arranged between the wearing surface 8 and the surface sealing layer 17, whereby the surface sealing layer 17 can be applied to the further adhesion promoter layer 21.

Ultimately, the other adhesion promoter layer 21 serves to improve the bonding and/or connection of the surface sealing layer 17 with the wearing surface 8.

Both the first adhesion promoter layer 19 and/or the other adhesion promoter layer 21 may comprise or consist of a primer.

In addition, method step H can be carried out before or after embossing in step D. FIG. 5 shows that method step H is carried out after embossing of the layer composite 9 with the structure 10.

Not shown is that in step C, a lamination method is used to bond the base layer 4 to the wearing surface 8, wherein the wearing surface 8 is bonded to the base layer 4 by pressure and/or heat. Such a method may also be referred to as thermal lamination.

FIG. 8 schematically shows that a laminating agent 22 is used for lamination in step C.

The laminating agent 22 can ultimately also form a layer which is arranged at least in certain areas, preferably over the entire surface, on the top 5 of the base layer 4 and/or on the top 23 of the décor 6. The laminating agent 22 may be an adhesive, in particular a varnish, glue and/or resin.

Before lamination (in method step C), the laminating agent 22 can be applied to the bottom 24 of the wearing surface 8 facing away from the usable side 7 and/or to the top 5 of the base layer 4 and/or to the top 23 of the décor 6, at least in certain areas. In this context, it is understood that the top 5 of the base layer 4 can also be understood to mean the top 23 of the décor 6. Preferably, an at least substantially full-surface application of the laminating agent 22 is provided.

In an alternative embodiment, not shown, it can be provided that the wearing surface 8 is joined to the base layer 4 to form the layer composite 9 in method step C by means of lamination. During lamination, it is possible in particular to dispense with the use of a laminating agent 22 or a further auxiliary material for bonding.

Furthermore, it is not shown that in method step D the embossing of the structure 10 is carried out by means of a structure cylinder, wherein the cylinder can roll on the surface of the top layer 1 and thereby presses and/or embosses the structure 10 into the top layer 1 or the layer composite 9.

Not shown is that the décor 6 can be applied to the base layer 4 by means of a printing cylinder and/or by means of print heads in a digital printing process.

Accordingly, the layer composite 9 can be embossed and/or heated during embossing, preferably by means of pressure and/or heat.

Further, it is not shown that the décor 6 is printed on the base layer 4 using offset printing, flexographic printing, digital printing, gravure printing, and/or screen printing.

Alternatively or additionally, it can also be provided that the printing of the décor 6 is built up from several individual image layers, in particular wherein the printing is carried out by a rotogravure printing process. This embodiment is also not shown in more detail.

FIG. 6 shows a polyvinyl chloride-free top layer 1. The top layer 1 is provided for bonding, preferably for lamination, to a carrier plate 2 of a decking element 2, as can be seen schematically from FIGS. 13 to 15. The top layer 1 may have been produced by a method according to any of the preceding embodiments.

The top layer 1 shown in FIG. 7 has a base layer 4 printed with a décor 6 and a wearing surface 8. The base layer 4 and the wearing surface 8 are firmly bonded to one another—at least in some areas—to form a layer composite 9. The layer composite 9 can be embossed, at least in some areas, with a structure 10 that is at least substantially synchronous with the décor 6.

What is meant by a décor-synchronous structure 10 has already been explained.

Ultimately, at least substantially and at least in some areas, some elements 18 of the décor 6 coincide with corresponding recesses 13 of the layer composite 9. Preferably, a full-surface décor-synchronous formation of the structure 10 is provided.

FIG. 12 shows schematically that the structure 10 or the recess 13 on the top 11 of the layer composite 9 is visible both on the top 11 and, at least in some areas, on the bottom 12 of the layer composite 9. The depth 15 of the recess 13 may be greater than the height 16 of the protrusion 14 corresponding to the recess 13 on the bottom. Ultimately, not every recess 13 has to form a protrusion 14 on the bottom 12. In particular, for at least some recesses 13, it is provided that corresponding protrusions 14 can be formed on the bottom.

In FIG. 12, the depth 15 is schematically drawn and/or shown. It is not shown that the maximum depth 15 of the structure 10 is up to 1 mm, preferably between 0.05 mm to 0.2 mm.

The layered structure shown in FIG. 12 has a cured surface sealing layer 17, preferably formed as a lacquer layer, on the top 11 of the layer composite 9.

Also not shown is that the structure 10 on the bottom 12 of the layer composite 9 and/or the top layer 1 has/have a maximum height, or the protrusions 14 on the bottom 12 have a maximum height 16 of at most 100 µm.

The top layer 1 shown in FIG. 6 has a thickness 25 of at least 0.1 mm, in particular between 0.2 mm and 0.3 mm.

Not shown is that the base layer 4 is formed as a base film and/or a base foil.

Furthermore, it is not apparent from the embodiments shown that preferably the base layer 4 and/or the wearing surface 8 comprises and/or consists of a thermoplastic, preferably polypropylene, polyethylene and/or polyurethane, as the polyvinyl chloride-free material.

FIG. 15 shows a decking element 3. The decking element 3 may be intended for use as a floor, wall and/or ceiling covering element for a floor, wall and/or ceiling covering. The decking element 3 comprises a carrier plate 2 and a top layer 1 according to one of the preceding embodiments. The bottom 26 of the top layer 1 facing away from a usable side 7 is firmly connected to the top 27 of the carrier plate 2 facing the usable side 7, preferably connected over the entire surface.

It may also be provided, in further embodiments, that the bottom 26 is connected to the top 27 at least in certain areas.

Preferably, the top layer 1 has been laminated to the top 27 of the carrier plate 2.

FIG. 13 shows that corresponding tongue and groove connection geometries 28 are provided on opposite sides of the carrier plate 2, in particular for forming a click connection. The tongue and groove connection geometries 28 have a groove side 29 with a groove 30 and a tongue side 31 with a tongue 32. The groove side 29 is opposite the tongue side 31.

FIG. 15 shows that opposite sides of the longitudinal sides are formed as corresponding tongue and groove sides 29, 30.

Not shown is that opposite sides of the transverse sides are formed as corresponding tongue and groove sides 29, 30.

Not shown is that opposite sides of the carrier plate 2 have corresponding snap fastener and/or bayonet connection geometries.

FIG. 13 further shows that a countermove 34 is disposed on the bottom 33 of the carrier plate 2. In further embodiments, the countermove 34 may comprise a kraft paper, a cork layer and/or expanded polyolefin (XPO).

The carrier plate 2 shown in FIG. 13 is a HDF board. It is not shown that in further embodiments the carrier plate 2 can be a real wood layer and/or a MDF board.

Furthermore, it is not shown that the carrier plate 2 has a plastic as material and/or consists thereof, preferably polypropylene and/or polyethylene. It is particularly preferred that the carrier plate 2 is also free of polyvinyl chloride.

The carrier plate 2 shown in FIG. 13 has a layer thickness 35 of at least 2 mm.

LIST OF REFERENCE SIGNS

1 Top layer
2 Carrier plate
3 Decking element
4 Base layer

5 Top from 4
6 Décor
7 Usable side
8 Wearing surface
9 Layer Composite
10 Structure
11 Top of 9
12 Bottom of 9
13 Recesses
14 Protrusions
15 Depth from 13
16 Height from 14
17 Surface sealing layer
18 Elements from 6
19 first adhesion promoter layer
20 Bottom of 4
21 other adhesion promoter layer
22 Laminating agent
23 Top of 6
24 Bottom of 8
25 Thickness from 1
26 Bottom of 1
27 Top of 2
28 Tongue and groove connection geometry
29 Groove Side
30 Groove
31 Tongue Side
32 Tongue
33 Bottom of 2
34 Countermove
35 Layer thickness from 2

The invention claimed is:

1. A method of producing a polyvinyl chloride-free top layer for a decking element, the method comprising:
   A) providing a base layer comprising plastic;
   B) printing a décor on a top of the base layer facing a top side;
   C) bonding a transparent, wearing surface to the printed base layer to form a solid layer composite that includes the base layer, the décor and the wearing surface, the wearing surface being a thermoplastic material;
   D) embossing at least a portion of the layer composite with an embossment, the embossment being embossed into the layer composite from the top which causes the base layer to be deformed in a vertically aligned manner to produce a protrusion toward a carrier plate; and
   E) applying a surface sealing layer to a top of the layer composite facing the top side.

2. The method according to claim 1, wherein one or more of:
   the application of the surface sealing layer takes place before or after the embossing of the layer composite,
   curing the surface sealing layer before or after the embossing of the layer composite, and
   curing of the surface sealing layer by electron beam curing.

3. The method according to claim 1, wherein a first adhesion promoter layer is applied to a bottom of the base layer and/or in that another adhesion promoter layer is applied at least in regions after formation of the layer composite and before application of the surface sealing layer is applied to the top of the wearing surface facing opposite the base layer, wherein the surface sealing layer, is applied to the other adhesion promoter layer.

4. The method according to claim 1, wherein one or more of:
   the wearing surface is bonded to the base layer by pressure lamination and/or heat,
   during lamination, a laminating agent is used to bond the wearing surface to the base layer wherein one or more of varnish, glue and/or resin is used as the laminating agent and/or, wherein the laminating agent is applied, at least in regions, to the bottom of the wearing surface facing away from the top side and/or to the top of the base layer before lamination, and
   the wearing surface is joined to the base layer to form the layer composite by lamination.

5. The method according to claim 1, wherein the embossing of the layer composite is carried out by a structural cylinder, wherein the layer composite is embossed and/or heated for embossing, and/or
   the décor is printed onto the base layer by one or more of: offset printing, flexographic printing, rotogravure printing, digital printing, gravure printing and screen printing.

6. The method of claim 1, wherein the embossing is aligned with the décor.

7. The method of claim 1, wherein a depth of the embossing is greater than a height of the protrusion.

8. A polyvinyl chloride-free top layer configured for connection to a carrier plate of a decking element, comprising,
   a plastic top layer including a base layer printed with décor, and
   a wearing surface, wherein the base layer and the wearing surface are connected to one another to form a layer composite, wherein the layer composite is embossed with an embossment, the embossment being embossed into the layer composite from the top which causes the base layer to be deformed in a vertically aligned manner to produce a protrusion toward the carrier plate.

9. The top layer according to claim 8, wherein the structure, has a maximum depth of up to 1 mm, and/or
   the structure on the bottom of the layer composite and/or of the top layer has a maximum height of up to 100 µm, and/or
   the top layer has a thickness of at least 0.1 mm.

10. The top layer according to claim 8, wherein the base layer is formed as a base film and/or base foil and/or
    the base layer and/or the wearing surface has as polyvinyl chloride-free material one or more of: a thermoplastic, a polypropylene, a polyethylene, and a polyurethane.

11. A decking element configured for use as a floor, wall and/or ceiling covering element for a floor, wall and/or ceiling covering, having at least one carrier plate and at least one top layer according to claim 8, wherein the bottom of the top layer facing away from a top side is connected to the top of the carrier plate facing the top side.

12. The decking element according to claim 11, wherein one or more of:
    corresponding tongue and groove connection geometries with a groove side having a groove and a tongue side having a tongue and located opposite the groove side are provided on opposite sides of the carrier plate,
    corresponding snap fastener and/or bayonet connection geometries are provided on opposite sides of the carrier plate,
    a countermove is arranged facing the bottom of the carrier plate,
    the carrier plate is one or more of: a HDF plate (high-density fiberboard), a real wood layer and/or a MDF plate (medium-density fiberboard) and/or the carrier plate includes a plastic which includes one or more of a polypropylene, a polyethylene and/or in that the carrier plate is free of polyvinyl chloride, and the carrier plate has a layer thickness of at least 2 mm.

13. A polyvinyl chloride-free top layer configured for connection to a carrier plate of a decking element comprising:

a base layer including plastic, the base layer configured for connection to a carrier plate, a décor layer printed on a top surface of the base layer, a wearing surface layer including thermoplastic applied to the décor layer, and a sealing layer of at least one polymer compound on the wearing surface, wherein an embossing of a top surface of the polyvinyl chloride-free top layer displaces in a vertically aligned manner the base layer, the décor layer, the wearing surface and the sealing layer.

14. The top layer of claim 13, further comprising an adhesion promoting layer configured to attach the top layer to the carrier plate, the adhesion promoting layer displaced as a result of the embossing.

15. The top layer of claim 13, further comprising one or more of a tongue and a groove.

16. The top layer of claim 13, wherein the embossing causes a protrusion in the base layer opposite the embossing.

17. The top layer of claim 16, wherein a depth of the embossing is greater than a height of the protrusion.

18. The top layer of claim 13, further comprising a laminating agent between the décor and the wearing surface, wherein the laminating agent is one or more of a urethane adhesive, varnish, glue and resin.

19. The top layer of claim 13, wherein the base layer includes a polyvinyl chloride-free material of one or more of: a thermoplastic, a polypropylene, a polyethylene, and a polyurethane.

20. The top layer of claim 13, wherein the wearing surface includes a polyvinyl chloride-free material of one or more of: a thermoplastic, a polypropylene, a polyethylene, and a polyurethane.

21. The top layer of claim 13, wherein the décor is printed onto the base layer by one or more of: offset printing, flexographic printing, rotogravure printing, digital printing, gravure printing and screen printing.

22. The top layer of claim 13, wherein the embossing is aligned with the décor.

* * * * *